Figure 1:
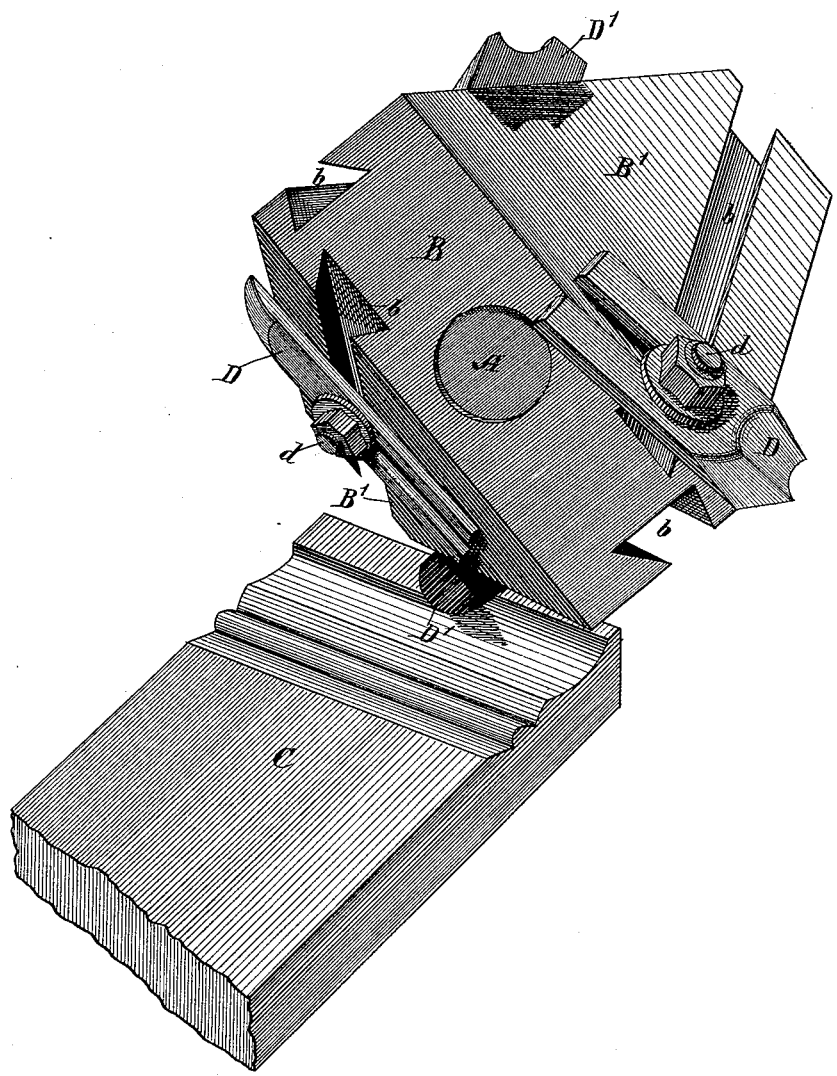

(No Model.)

R. HEGENER.

CUTTER HEAD.

3 Sheets—Sheet 1.

No. 335,582. Patented Feb. 9, 1886.

Witnesses:

Inventor:
Rudolph Hegener
by Munday Evarts & Adcock
his Attys (No Model.)

R. HEGENER.
CUTTER HEAD.

No. 335,582. Patented Feb. 9, 1886.

Witnesses:
Chas. Baur
H. M. Munday.

Inventor:
Rudolph Hegener
by Munday, Evarts & Adcock
his attys

UNITED STATES PATENT OFFICE.

RUDOLPH HEGENER, OF SOUTH CHICAGO, ILLINOIS.

CUTTER-HEAD.

SPECIFICATION forming part of Letters Patent No. 335,582, dated February 9, 1886.

Application filed October 6, 1885. Serial No. 179,118. (No model.)

*To all whom it may concern:*

Be it known that I, RUDOLPH HEGENER, a citizen of the United States, residing in South Chicago, in the county of Cook and State of Illinois, have invented a new and useful Improvement in Cross-Cut Molding - Heads, of which the following is a specification.

My invention relates to revolving knife heads or holders for cutting moldings or other irregular forms in wood across the grain thereof.

It has long been customary to make moldings whereon the grooves or raised portions run with the grain in the wood by means of revolving cutters, the board being fed continuously along on a suitable table or guide under the revolving cutter-head, and in this way such moldings can be manufactured very rapidly and cheaply; but prior to my invention those moldings wherein the grooves and raised portions were desired to run at right angles to or across the grain of the wood could not be successfully manufactured by revolving cutters, because the deepest and middle portion of the groove being cut first by the knife or cutters, and the higher and marginal portions last, the knife or cutter as the board advances cuts from the lowest and central portions of the grooves upward and outward, and therefore has such a tendency to split or break off the extreme top portion of the narrow ridges or high portions of the molding that it is found impracticable to make moldings across the grain of the wood in this way; and also when the knives or cutters make a slanting upward cut against the grain of the wood from the central deeper portions of the grooves to the higher marginal portions of the groove they tend to leave a rough or unsmooth surface, which requires a subsequent dressing and polishing with sand - paper, &c. Owing to the difficulty or impracticability of making cross-cut moldings with rotary cutters they have heretofore usually been made by means of scroll or jig saws; but in order to saw them the block has to be previously marked or scribed, and the surface left by the saw requires sandpapering and polishing.

It is the object of the present invention to provide a rotary cutter - head whereby such cross-cut moldings may be rapidly and cheaply manufactured without any danger of the knives or cutters splitting or breaking off the narrow high portions or ridges of the molding between the contiguous grooves thereof, and whereby the knives will leave a smooth and polished surface upon the finished molding; and my invention consists in providing the molding - head with faces upon which the knives are secured, inclined at an angle to the axis of the head or of the shaft upon which the head revolves, so that the knives or cutters secured thereto will each stand at an incline, and have that side or edge of the knife which cuts the higher and marginal portions of the groove advanced before its other side or edge which cuts the central and deeper part of the groove. By this means the knife is always made to cut downward and inward from the higher and marginal portion of the groove toward the central and deeper portions thereof. The opposite sides or walls of each groove are cut by different knives oppositely inclined to each other, so that the higher and marginal portions of each side or wall of the groove will be cut in advance of or before the central and deeper part of the groove.

The revolving head may be provided with any number of inclined faces desired, and one or more knives may be secured on each inclined face of the head. Preferably, however, I make the head with four inclined faces—two inclined in one direction toward the axis of the head or its shaft and two in the other.

Figure 2:
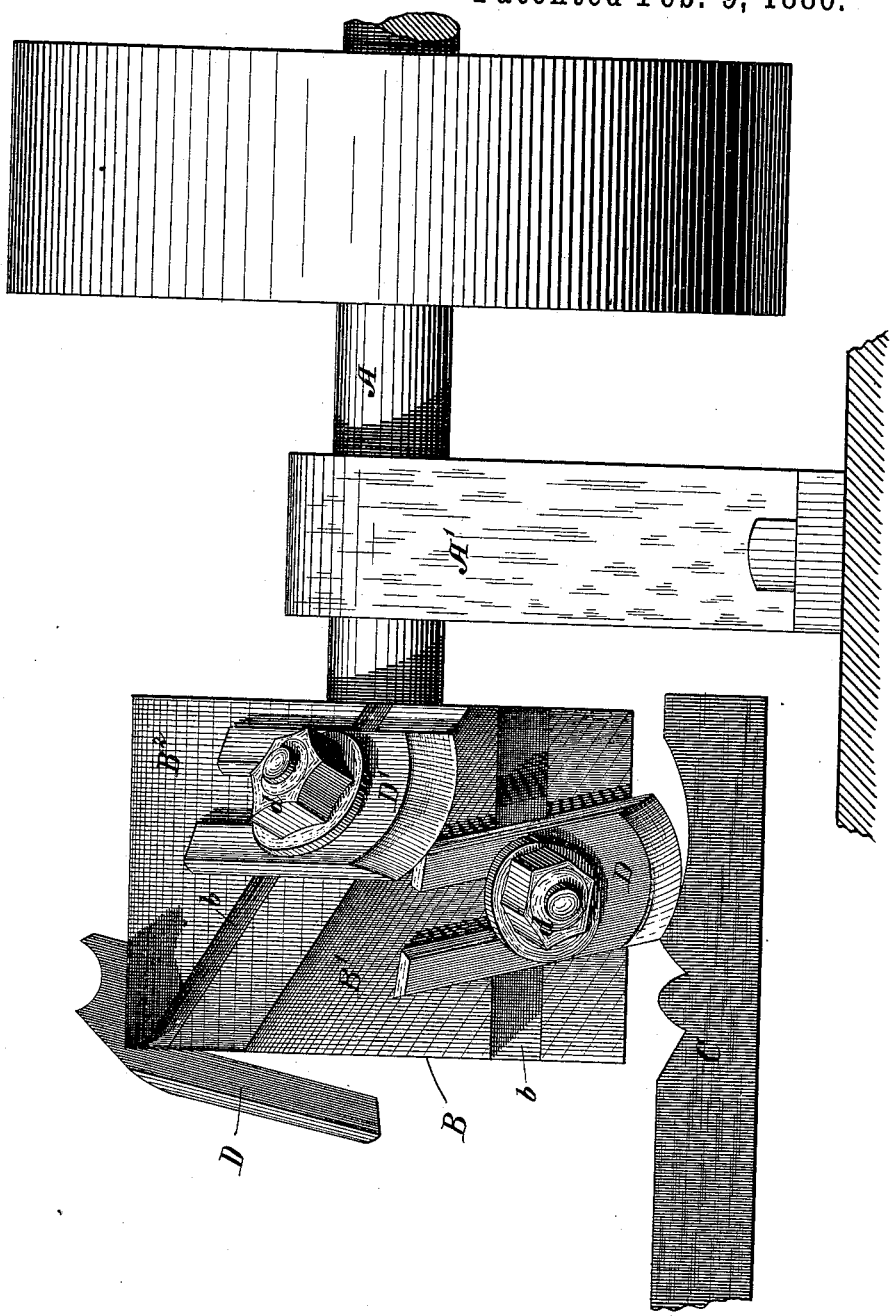
Figure 3:
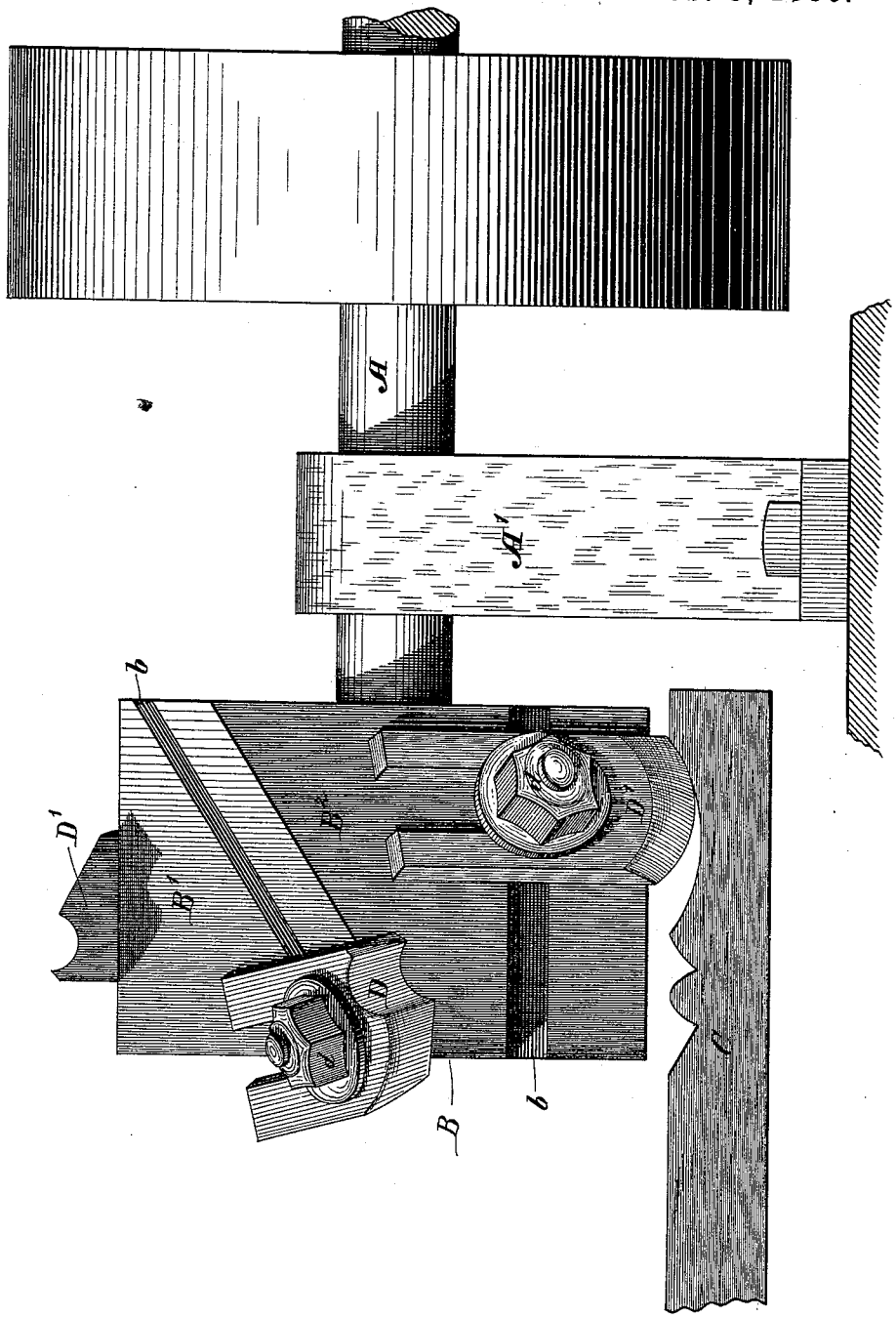

In the accompanying drawings, which form a part of this specification, and in which similar letters of reference indicate like parts, Figure 1 is a perspective view looking at the end of my revolving cross-cut molding-head, and Figs. 2 and 3 are side elevations showing the two oppositely-inclined knives or cutters which cut the opposite sides or walls of the same groove in position for operation.

In said drawings, A represents the shaft upon which the revolving head B is secured, and A' are bearings in which said shaft may be journaled.

C represents a board or molding to be cut across the grain of the wood resting upon a suitable guide or table upon which it is fed under the cutters.

The revolving head B has preferably four knife-faces, B' B², inclined toward the axis of the head or its shaft, the faces B' being inclined oppositely to the faces B². The inclination of these faces should preferably be ordinarily about thirty degrees to the axis of the shaft C. The knives or cutters D D' are secured to these faces B' B² of the revolving head by bolts or screws d, the heads of which fit in dovetail grooves or guides b, cut in the faces B' B² of the head. The contour or shape of the cutters D D' varies, of course, according to the particular form of groove or molding to be cut. The faces of the cutters of course do not stand parallel to the axis of the head, but have the same inclination as the faces of the head to which they are secured; and the oppositely-inclined knives or cutters cut opposite sides or walls of the groove. Those knives which incline to the right and consequently have their right-hand edges advanced, cut the right sides or walls of the groove, and those inclined to the left cut the left sides or walls of the grooves, so that the higher and marginal portions of the groove are cut first, and the knives consequently have no tendency to split or break off the weak narrow top portions of the ridges between the contiguous grooves.

The knives or cutters may be adjusted up or down to cut deeper or shallower by means of the set-screws or bolts d, and also laterally in the grooves or guides. The grooves or guides b should be cut parallel to the corners or edges of the faces of the inclined faces of the head.

The opposite faces B' B' are both inclined to the left toward the axis of the head, and the opposite faces B² B² are both inclined to the right toward the axis of the shaft, and the knives D D, secured to the faces B' B', when the head is revolved to bring each of said knives into the cutting position will have the same inclination to the wood, and consequently both cut the left sides or walls of the grooves. In like manner the knives D' D' cut the right sides or walls of the grooves. By this arrangement it will be observed that the head is symmetrical or balanced on its axis, notwithstanding its oppositely-inclined faces for securing the knives, said four faces being all similar to each other, and each face being in the form of a triangle with truncated apex.

The feed-table may be of any ordinary construction, and the head may be secured to any suitable revolving shaft operated by a belt and pulley or otherwise.

I claim—

1. The device for cutting grooves or moldings across the grain of the wood, consisting in a symmetrical-shaped revolving head, B, having four similar inclined faces, B' B' B² B², arranged at right angles to each other circumferentially around the axis of said head, one diametrically-opposite pair of said faces, B' B', being inclined to the left toward the axis of said head, and the other opposite faces, B² B², being inclined to the right toward the axis of said head, and knives or cutters secured to said inclined faces, whereby both sides or walls of the groove or molding may be cut inward and downward from the higher or marginal portion of the groove or molding toward the deeper and central portion of the same, substantially as specified.

2. The revolving cutter-head B, having four similar triangular-shaped faces, B' B' B² B², inclined to the axis of said head, the opposite faces B' B' being inclined in the opposite direction to the two opposite faces B² B², whereby a symmetrical-shaped head is produced, substantially as specified.

3. The revolving cutter-head B, having similar triangular-shaped inclined faces, B' B², provided with grooves or guides b, extending parallel to the edges of said faces, and knives or cutters secured to said faces by set screws or bolts adjustable in said grooves or guides b, substantially as specified.

4. The revolving cutter-head B, having faces B' B² inclined toward the axis of said head, provided with grooves or guides b, extending parallel to the edges of said faces, and knives or cutters secured to said faces by set screws or bolts adjustable in said grooves or guides b, the edges of said faces or said grooves lying in a plane parallel to the axis of said head, so that the adjustment of the knife to different positions in said groove will not affect the depth of cut or the distance the knife projects beyond the edge of said inclined face, substantially as specified.

5. A revolving head, as B, having a face, as B', inclined to the axis of said head, and a knife, as D, secured to said face, whereby the edge or side of said knife which cuts the higher or marginal portion of the groove is presented to the work in advance of the other edge or side of said knife which cuts the deeper or central portion of said groove, said inclined face B' having also an edge which lies in a plane parallel to the axis of said head, so that said knife may be adjusted in different positions longitudinally with the axis of said head without affecting the depth of the cut or the distance the knife projects beyond the supporting-edge of said inclined face, substantially as specified.

RUDOLPH HEGENER.

Witnesses:
H. M. MUNDAY,
EDMUND ADCOCK.